(12) United States Patent
Beaver

(10) Patent No.: US 10,189,195 B2
(45) Date of Patent: Jan. 29, 2019

(54) PLATEN FOR AN INJECTION MOLDING MACHINE

(71) Applicant: TYCO ELECTRONICS CORPORATION, Berwyn, PA (US)

(72) Inventor: Byron L Beaver, Palmyra, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 219 days.

(21) Appl. No.: 15/276,215

(22) Filed: Sep. 26, 2016

(65) Prior Publication Data

US 2018/0085980 A1    Mar. 29, 2018

(51) Int. Cl.
*B29C 45/17*    (2006.01)
*B29L 31/00*    (2006.01)
*B29C 33/30*    (2006.01)

(52) U.S. Cl.
CPC .......... *B29C 45/1744* (2013.01); *B29C 33/30* (2013.01); *B29C 33/303* (2013.01); *B29C 45/1743* (2013.01); *B29L 2031/757* (2013.01)

(58) Field of Classification Search
CPC . B29C 45/1743; B29C 45/1744; B29C 33/30; B29C 33/303
See application file for complete search history.

(56) References Cited

U.S. PATENT DOCUMENTS

| | | | | |
|---|---|---|---|---|
| 4,348,165 A | * | 9/1982 | Vostrovsky | B23Q 1/0063 425/185 |
| 5,112,214 A | * | 5/1992 | Glatt, Jr. | B29C 45/1742 425/472 |
| 5,308,234 A | * | 5/1994 | Nicke | B29C 45/1743 425/188 |
| 5,620,718 A | * | 4/1997 | Bohm | B29C 45/1743 425/190 |
| 9,221,203 B2 | * | 12/2015 | Cerniglia | B29C 45/1761 |

FOREIGN PATENT DOCUMENTS

DE    29 47 938    *  6/1981

* cited by examiner

*Primary Examiner* — James P Mackey

(57) ABSTRACT

A platen for use with an injection molding machine includes a body having an opening for receiving a ring protruding from a mold for aligning the body and the mold. The opening includes a tapered recess having a surface extending radially outward from the opening. The tapered recess defines opposed edges along an outer surface of the body, the opposed edges converging in a radially outward direction away from the opening.

17 Claims, 5 Drawing Sheets

PLATEN FOR AN INJECTION MOLDING MACHINE

FIELD OF THE INVENTION

The present invention is directed to injection molding machines. In particular, the invention is directed to a platen having an opening configured for improved assembly with a mold.

BACKGROUND OF THE INVENTION

Injection molding machines are utilized to manufacture articles for use in many applications. In one example of an injection molding machine, a mold having opposed halves and in a closed position is injected with pressurized material in a plastic state that conforms to the mold cavity. After curing in the mold, the newly formed articles are ejected after the mold halves are separated from each other. The mold is then placed in a closed position and the process is repeated.

Molds are typically extremely heavy and bulky, and not surprisingly, are difficult to install in an injection molding machine. The mold, which is generally suspended from a crane, must be brought into alignment with a mating feature of the platen. Since the mating features provide small amounts of clearance, precise alignment of the mold and the platen is required. Unfortunately, such alignment typically requires numerous adjustments in both vertical and horizontal directions, and is time-consuming and frustrating.

It would, therefore, be highly beneficial to simplify the installation of molds in injection molding machines.

SUMMARY OF THE INVENTION

An embodiment is directed to a platen for use with an injection molding machine including a body having an opening for receiving a ring protruding from a mold for aligning the body and the mold. The opening includes a tapered recess having a surface extending radially outward in a vertical direction from at least one of an upper portion and a lower portion of the opening, the tapered recess defining opposed edges along an outer surface of the body. In response to the ring of the mold being positioned at least partially vertically above the opening or positioned at least partially beneath the opening and laterally aligned with the opening such that the ring is brought into contact with at least one of the opposed edges of the tapered recess and the surface of the tapered recess, and a continuous force applied to the mold toward the opening, and the ring being incrementally moved vertically toward the opening, at least one of the opposed edges and the surface of the tapered recess guiding the ring into engagement with the opening.

A further embodiment is directed to a platen for use with an injection molding machine including a body having an opening for receiving a ring protruding from a mold for aligning the body and the mold, the opening including a tapered recess having a surface extending radially outward from the opening. The tapered recess defining opposed edges along an outer surface of the body, the opposed edges converging in a radially outward direction away from the opening.

A yet further embodiment is directed to a method of assembling an injection molding machine including providing a platen and a mold, the platen having an opening for receiving a ring protruding from the mold for aligning the platen and the mold, the opening including a tapered recess having a surface extending radially outward in a vertical direction from at least one of an upper portion and a lower portion of the opening, the tapered recess defining opposed edges along an outer surface of the body. The method further includes vertically aligning the mold ring with the platen opening such that the mold ring contacts of at least one of the opposed edges of the tapered recess and the surface of the tapered recess. The method further includes continuously applying a force to maintain contact between the mold ring and at least one of the opposed edges of the tapered recess and the surface of the tapered recess. The method further includes vertically moving one of the platen and the mold relative to the other of the platen such that the mold ring is moved toward the opening, thereby permitting at least one of the opposed edges of the tapered recess and the surface of the tapered recess to guide the mold ring into engagement with the opening.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Figure 1:
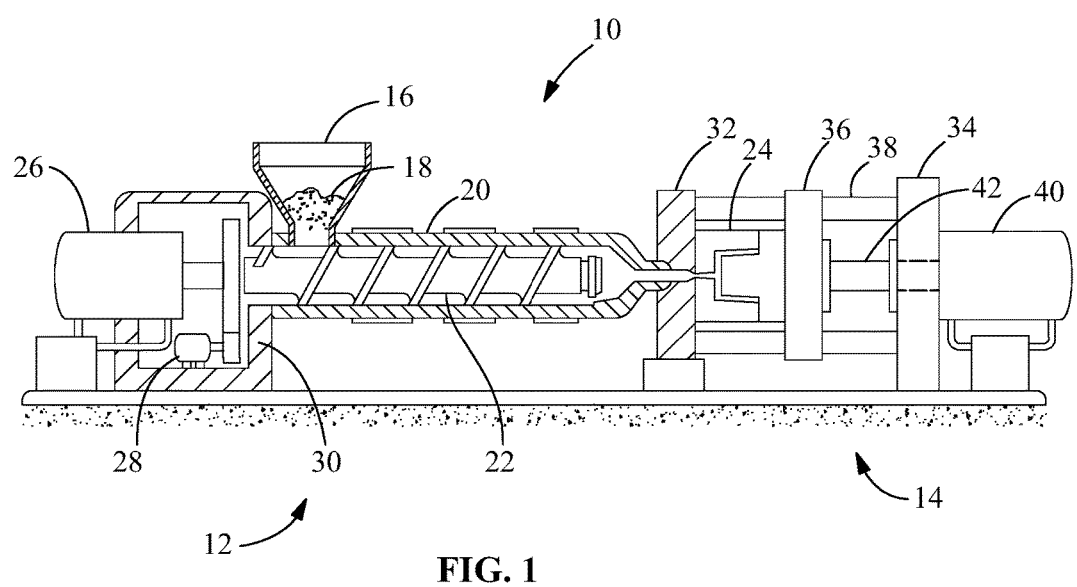
FIG. 1 is a schematic view of an exemplary injection molding machine of the present invention.

FIG. 1 is a schematic representation of an exemplary injection molding machine 10. Injection molding machine 10 includes an injection unit 12 and a clamping unit 14. Injection unit 12 includes a hopper 16 for receiving a material 18 into a barrel 20 having a reciprocating screw 22 for conveying material 18 into a mold 24. A hydraulic cylinder 26 selectively laterally moves reciprocating screw 22 relative to barrel 20, and a motor 28 and associated gears 30 rotatably drive the reciprocating screw to force material 18 into mold 24. Clamping unit 14 includes a movable platen 36 positioned between stationary platens 32, 34. Movable platen 36 is slidably movable along tie rods 38 extending between platens 32, 34. A hydraulic motor 40 drives a rod 42 for laterally compressively positioning mold 24 between platens 32, 36. Once mold 24 has been laterally compressively positioned between platens 32, 36, pressurized plastic state material 18 can then be provided through barrel 20, platen 32 and then into mold 24.

Figure 2:
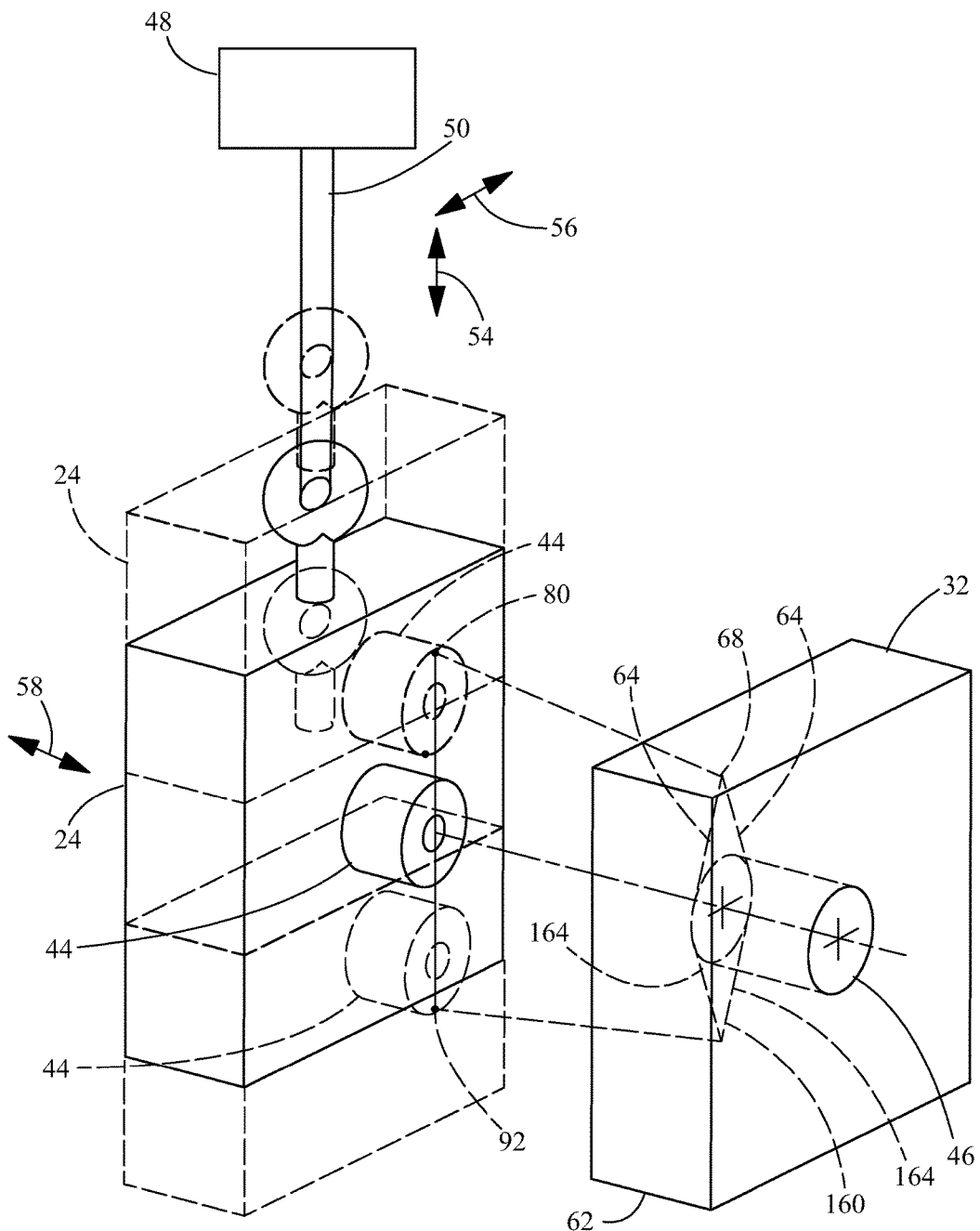
FIG. 2 is an exploded top perspective view of an exemplary mold and platen of the present invention.

As shown in FIG. 2, prior to operating injection molding machine 10 (FIG. 1), mold 24 must first be installed or engagingly secured to platen 32. Installation of mold 24 involves aligning a ring 44 of mold 24, commonly referred to in the art as a locating ring, with an opening 46 of platen 32. Mold 24 is suspended from a cable 50 deployed/retracted from a crane 48 for selectively controlling movement in a vertical direction 54. Selective horizontal positioning of mold 24 can be provided by selectively moving crane 48 in a horizontal direction 56. Prior to the novel improvement to the opening of the platen, which is explained in additional detail below, aligning the mold ring with the opening of the platen was a cumbersome, time-consuming process often involving multiple iterations of vertical and horizontal adjustments of the mold in order to achieve alignment of the ring of the mold with the opening of the platen in order to install the mold. Returning to FIG. 2, once mold 24 has been installed, a tip of barrel 20 (FIG. 1) is inserted in one end of opening 46 of platen 32 and ring 44 of mold 24 is inserted in the other opening of opening 46. As a result of this connection, pressurized plastic state material 18 (FIG. 1) from barrel 20 (FIG. 1) can flow into and through opening 46 of platen 32 and then through ring 44 and into a cavity formed in mold 24 to form an injection molded article.

Figure 4:
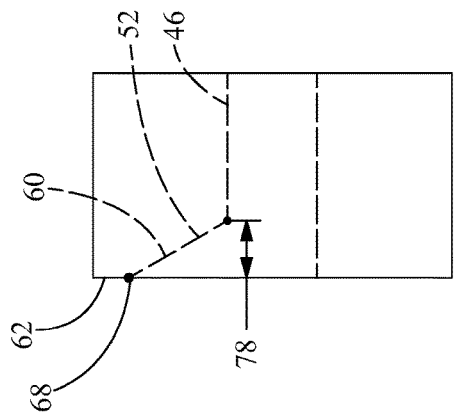
FIG. 4 is a side view of the platen of FIG. 2 of the present invention.
Figure 3:
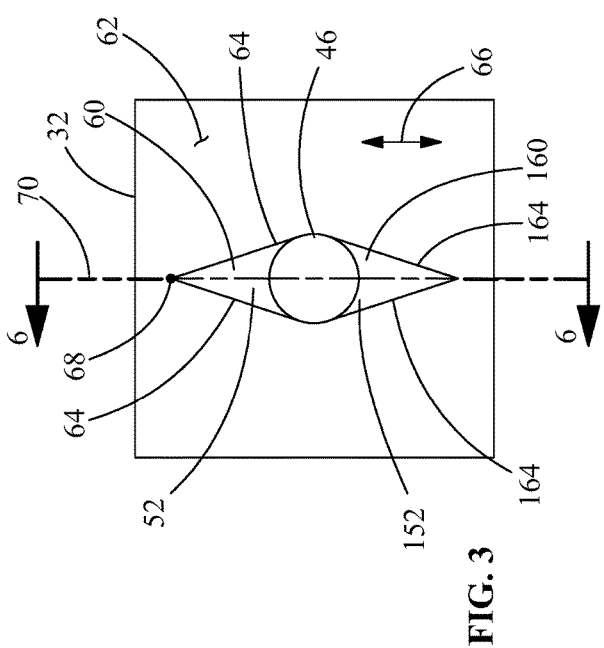
FIG. 3 is a front view of the platen of FIG. 2 of the present invention.
Figure 7:
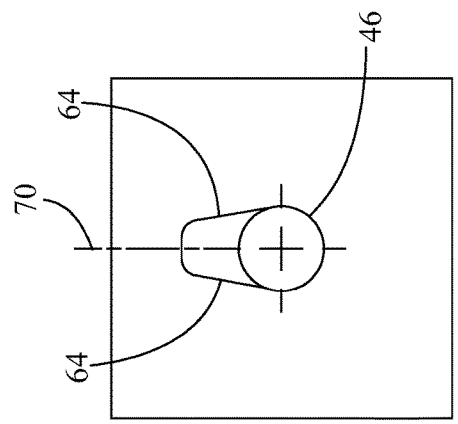
FIGS. 7-10 are respective front views of exemplary platens of the present invention.
Figure 8:
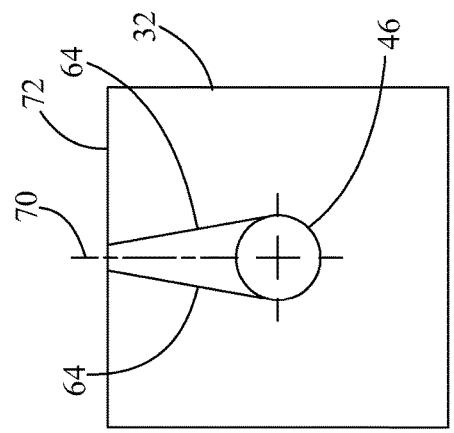
Figure 9:
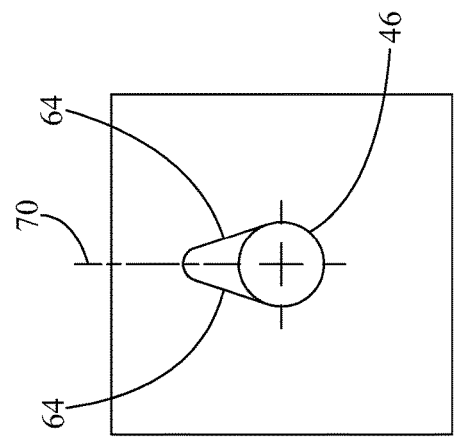

FIGS. 3 and 4 show a novel tapered recess 60 incorporated into a platen 32 for greatly simplifying an installation of a mold 24 in an injection molding machine. Recess 60 extends radially outward from opening 46 which extends through platen 32. Recess 60 defines opposed edges 64 along an outer surface 62 of platen 32. Surface 62 of platen 32 faces the mold during installation of the mold. In one embodiment, surface 62 is a planar surface. One end of each opposed edge 64 terminates at the periphery of opening 46. In one embodiment, each opposed edge 64 defines a straight line that terminates at a point tangent to the periphery of opening 46. FIG. 7 shows opposed edges 64 having a curved end opposite opening 46. FIG. 8 shows opposed edges 64 having a straight end opposite opening 46. FIG. 9 shows opposed edges 64 having at least partially curved portions.

Figure 5:
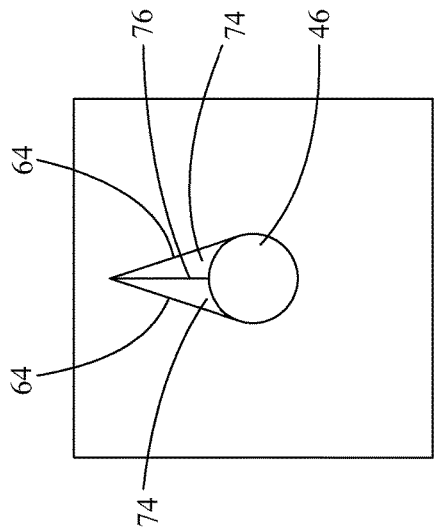
FIG. 5 is a front view of an exemplary platen of the present invention.
Figure 10:
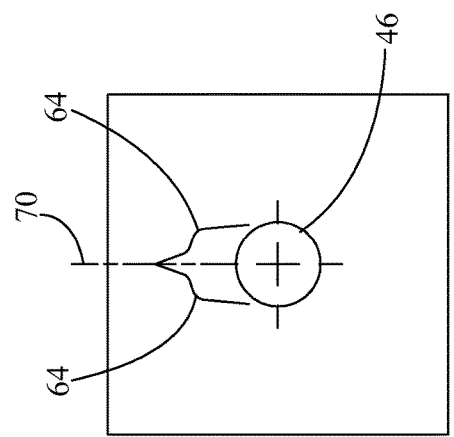

As further shown in FIG. 3, opposed edges 64 of recess 60 converge as the opposed edges extend toward a radially outward direction 66 away from opening 46. As shown in FIG. 3, opposed edges 64 intersect at a point 68. In one embodiment, as shown in FIG. 10, opposed edges 64 extending away from opening 46 terminate at an edge 72 of platen 32, and therefore, do not intersect. As further shown in FIG. 3, opposed edges 64 are symmetric about an axis 70. Preferably, axis 70 is oriented in a vertical direction, for reasons discussed in additional detail below. As shown in FIG. 4, recess 60 defines a taper, with one end of recess 60 intersecting opening 46 at a depth 78 from surface 62, and the other end of recess 60 terminating at or being coincident with surface 62. That is, the depth 78 of recess 60 from the surface 62 decreases in a radial direction away from opening 46. As further shown in FIG. 4, the depth of recess 60 is defined by a straight line, although in other embodiments at least a portion of recess 60 can be defined by a curve, and therefore, the depth of the taper can decrease at least partially linearly in a radial direction away from opening 46. In one embodiment, the depth of the taper can decrease at least partially non-linearly in a radial direction away from opening 46. As shown in FIG. 5, material removed to form recess 60 defines a pair of faceted surfaces 74 separated by a dividing line 76. In one embodiment, recess 60 can define a single surface. In one embodiment, at least a portion of recess 60 can define a curved surface.

Figure 6:
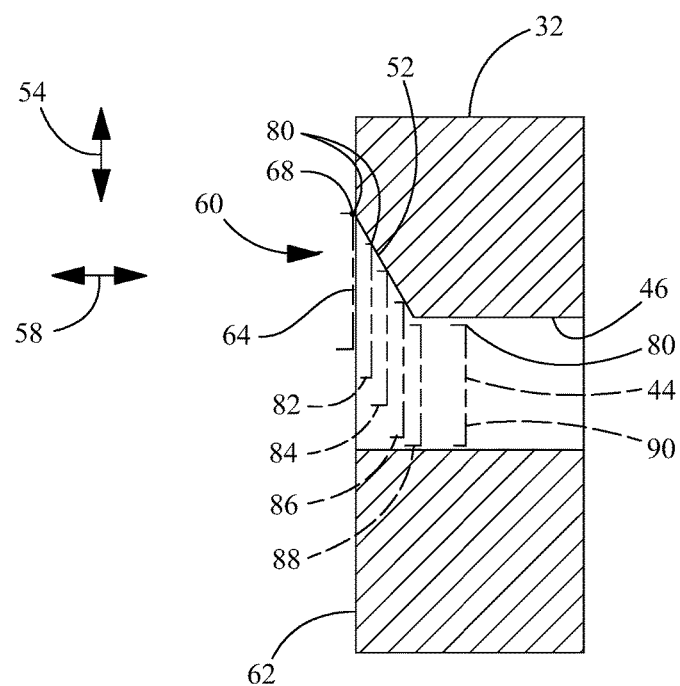
FIG. 6 is a cross-section view of the platen of FIG. 3, taken along line 6-6 of the present invention.

FIGS. 2 and 6 show an exemplary mold 24 being installed, secured to or engaged with an exemplary platen 32. First, mold 24, which is suspendedly supported by crane 48 and cable 50, is brought into proximity with platen 32 such that ring 44 of mold 24 faces surface 62 of platen 32. As mold 24 is brought into proximity with plate 32 via a combination of movements in respective vertical and horizontal directions 54, 56, 58 by crane 48, ring 44 of mold 24 is positioned at least partially vertically above opening 46 and laterally aligned with opening 46 in horizontal direction 56 such that an upper portion 80 of ring 44 is brought into contact with at least one of opposed edges 64 of recess 60, such as shown by ring 44 in position 82 (FIG. 6) and surface 52 (FIG. 3) of recess 60. In one embodiment, opposed edges 64 of recess 60 and surface 52 of recess 60 simultaneously contact upper portion 80 of ring 44. As further shown in FIGS. 2 and 6, surface 52 of recess 60 extends radially outwardly in vertical direction 54 toward crane 48. In position 82, ring 44 is partially inserted inside of recess 60. Preferably by sufficient movement of crane 48 in horizontal direction 58 toward platen 32, the center of gravity of mold 24 is similarly moved toward platen 32, resulting in a continuous force being applied to the mold toward the platen for maintaining contact between ring 44 and at least one of opposed edges 64 of recess 60 and surface 52 of recess 60. In response to mold 24 being incrementally moved in vertical direction 54 toward opening 46, ring 44 is guided by at least one of opposed edges 64 and surface 52 of recess 60 into positions 84, 86, 88 (FIG. 6) sequentially, in which position 88 represents an axially aligned position between ring 44 and opening 46. By virtue of continuous force in horizontal direction 58 toward platen 32, ring 44 is urged into full engagement in opening 46, or position 90 (FIG. 6), permitting operation of the injection molding machine.

Figure 11:
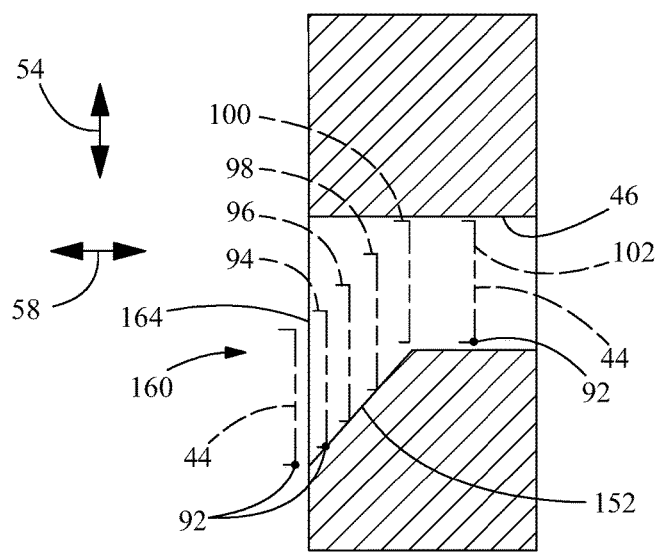
FIG. 11 is a cross-section view of the platen of FIG. 3, taken along line 6-6 of the present invention.

Alternately, platen 32 can be oriented, such as can be achieved by a rotation of platen 32 of 180 degrees about an axis of opening 46 (or optionally adding a second recess 160 (FIG. 3)), in which case recess 160 (FIG. 2) would extend radially outwardly in vertical direction 54 that is opposite recess 60 or away from crane 48. To achieve engagement of ring 44 with opening 46, mold 24 is brought into proximity with plate 32 via a combination of movements in respective vertical and horizontal directions 54, 56, 58 by crane 48 such that ring 44 of mold 24 is positioned at least partially vertically below opening 46 and laterally aligned with opening 46 in horizontal direction 56 such that a lower portion 92 of ring 44 is brought into contact with at least one of opposed edges 164 of recess 160 and surface 152 (FIG. 3) of recess 160. In one embodiment, opposed edges 164 of recess 160 and surface 152 of recess 160 simultaneously contact lower portion 92 of ring 44. In position 94 (FIG. 11), ring 44 is partially inserted inside of recess 160. Preferably by sufficient movement of crane 48 in horizontal direction 58 toward platen 32, the center of gravity of mold 24 is similarly moved toward platen 32, resulting in a continuous force being applied to the mold toward the platen for maintaining contact between ring 44 and at least one of opposed edges 64 of recess 160 and surface 152 of recess 160. In response to mold 24 being incrementally moved vertically toward opening 46, ring 44 is guided by at least one of opposed edges 164 of recess 160 and surface 152 of recess 160 into positions 96, 98, 100 (FIG. 11) sequentially, in which position 100 represents an axially aligned position between ring 44 and opening 46. By virtue of continuous force in horizontal direction 58 toward platen 32, ring 44 is urged into full engagement in opening 46, or position 102, permitting operation of the injection molding machine.

By virtue of recesses 60, 160 being oriented in a vertical direction, the force of gravity acting on mold 24 provides alignment between ring 44 of mold 24 and opening 46 of platen 32 such that at least one of opposed edges 64 of recess 60 and surface 52 of recess 60, or alternatively, at least one of opposed edges 164 of recess 160 and surface 152 of recess 160 guide ring 44 into full engagement in opening 46 without further adjustment in a non-vertical direction of the mold relative to the platen, simplifying and decreasing installation time of the mold, resulting in increased operational efficiency of the injection molding machine. In one embodiment, the recess can be oriented in a non-vertical arrangement, but may require adjustment in a non-vertical direction of the mold relative to the platen.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A platen for use with an injection molding machine comprising:
    a body having an opening for receiving a ring protruding from a mold for aligning the body and the mold, the opening including a tapered recess having a surface extending radially outward in a vertical direction from at least one of an upper portion and a lower portion of the opening, the tapered recess defining opposed edges along an outer surface of the body;
    wherein in response to the ring of the mold being positioned at least partially vertically above the opening or positioned at least partially beneath the opening and laterally aligned with the opening such that the ring is brought into contact with at least one of the opposed edges of the tapered recess and the surface of the tapered recess, and a continuous force applied to the mold toward the opening, and the ring being incrementally moved vertically toward the opening, at least one of the opposed edges and the surface of the tapered recess guiding the ring into engagement with the opening.

2. The platen of claim 1, wherein the opposed edges of the tapered recess converging as the opposed edges extend toward a radially outward direction away from the opening.

3. The platen of claim 2, wherein the opposed edges intersect at an end of the tapered recess away from the opening.

4. The platen of claim 1, wherein the opposed edges do not intersect.

5. The platen of claim 1, wherein the opposed edges are symmetric about an axis.

6. The platen of claim 1, wherein the tapered recess has a curved surface.

7. The platen of claim 1, wherein the tapered recess having a depth from the outer surface of the body, the depth decreasing in a radial direction away from the opening.

8. The platen of claim 7, wherein the depth of the tapered recess decreasing at least partially linearly in the radial direction away from the opening.

9. The platen of claim 7, wherein the depth of the tapered recess decreasing at least partially non-linearly in the radial direction away from the opening.

10. A platen for use with an injection molding machine comprising:
    a body having an opening for receiving a ring protruding from a mold for aligning the body and the mold, the opening including a tapered recess having a surface extending radially outward from the opening;
    wherein the tapered recess defining opposed edges along an outer surface of the body, the opposed edges converging in a radially outward direction away from the opening.

11. The platen of claim 10, wherein the opposed edges intersect at an end of the tapered recess away from the opening.

12. The platen of claim 10, wherein the opposed edges do not intersect.

13. The platen of claim 10, wherein the opposed edges are symmetric about an axis.

14. The platen of claim 10, wherein the tapered recess has a curved surface.

15. The platen of claim 10, wherein the tapered recess having a depth from the outer surface of the body, the depth decreasing in a radial direction away from the opening.

16. The platen of claim 15, wherein the depth of the tapered recess decreasing at least partially linearly in the radial direction away from the opening.

17. The platen of claim 15, wherein the depth of the tapered recess decreasing at least partially non-linearly in the radial direction away from the opening.

* * * * *